(12) United States Patent
Leto (10) Patent No.: US 9,051,621 B2
(45) Date of Patent: Jun. 9, 2015

(54) MATERIAL FOR USE WITH A CAPACITIVE TOUCH SCREEN

(75) Inventor: Gerald Leto, San Jose, CA (US)

(73) Assignee: GLT TECHNOVATIONS, LLC, San Jose, CA (US)

( * ) Notice: Subject to any disclaimer, the term of this patent is extended or adjusted under 35 U.S.C. 154(b) by 0 days.

(21) Appl. No.: 13/307,681

(22) Filed: Nov. 30, 2011

(65) Prior Publication Data

US 2012/0308806 A1    Dec. 6, 2012

Related U.S. Application Data (63) Continuation of application No. PCT/US2010/037286, filed on Jun. 3, 2010.

(60) Provisional application No. 61/217,653, filed on Jun. 3, 2009, provisional application No. 61/240,934, filed on Sep. 9, 2009, provisional application No. 61/266,840, filed on Dec. 4, 2009, provisional application No. 61/285,468, filed on Dec. 10, 2009.

(51) Int. Cl.
*D06M 19/00* (2006.01)
*B32B 5/02* (2006.01)
(Continued)

(52) U.S. Cl.
CPC ............ *C14C 3/06* (2013.01); *Y10T 29/49117* (2015.01); *Y10T 428/268* (2015.01); *C09D 175/04* (2013.01); *C14C 9/02* (2013.01); *C14C 11/006* (2013.01); *D06M 11/74* (2013.01); *D06M 11/83* (2013.01); *D06M 15/37* (2013.01);
(Continued)

(58) Field of Classification Search
CPC .... C09D 175/04; C14C 11/006; C14C 13/02; C14C 3/06; C14C 9/02; C08L 2666/20; D06M 11/74; D06M 11/83; D06M 15/37; D06M 15/63; D06M 23/08; D06N 3/0056; D06N 3/0063; B32B 9/025; B32B 2264/08; B32B 2317/08; D10B 2401/16; Y10S 428/904; Y10S 428/913
USPC ........ 8/94.1 R–94.19 R; 442/74, 75, 110, 111; 428/473, 904, 540
See application file for complete search history.

(56) References Cited

U.S. PATENT DOCUMENTS 2,287,744 A * 6/1942 Monahan ....................... 361/223
2,305,542 A * 12/1942 Mason ............................ 361/224
(Continued)

FOREIGN PATENT DOCUMENTS

| CN | 101240508 A | 8/2008 | |
|---|---|---|---|
| DE | 102007042644 | * 9/2007 | ............... D06N 3/00 |

(Continued)

OTHER PUBLICATIONS

EP Communication pursuant to Article 94(3) EPC, EP application No. 10784111.6, dated Jul. 15, 2013, 6 pages.
(Continued)

*Primary Examiner* — Jennifer A Steele
(74) *Attorney, Agent, or Firm* — Foley & Lardner LLP (57) ABSTRACT

A modified material for use with a capacitive touch screen is described. The modified material comprises a material impregnated with a composition comprising either a non-metallic and/or a metallic conductive agent with a binder. A variety of materials are contemplated, including, but not limited to leather. Also described is an apparatus and method of providing a conductive glove is disclosed.

2 Claims, 4 Drawing Sheets

(51) Int. Cl.
*B32B 9/02* (2006.01)
*C14C 3/06* (2006.01)
*C09D 175/04* (2006.01)
*C14C 9/02* (2006.01)
*C14C 11/00* (2006.01)
*D06M 11/74* (2006.01)
*D06M 11/83* (2006.01)
*D06M 15/37* (2006.01)
*D06M 15/63* (2006.01)
*D06M 23/08* (2006.01)
*D06N 3/00* (2006.01)
*C14C 13/02* (2006.01)

(52) U.S. Cl.
CPC ............ *D06M 15/63* (2013.01); *D06M 23/08* (2013.01); *D06N 3/0056* (2013.01); *D06N 3/0063* (2013.01); *C14C 13/02* (2013.01)

(56) References Cited

U.S. PATENT DOCUMENTS

| | | | |
|---|---|---|---|
| 3,817,820 A | 6/1974 | Smith | |
| 3,964,951 A * | 6/1976 | Kremer et al. | 156/272.2 |
| 4,016,127 A * | 4/1977 | Larsson et al. | 524/818 |
| 4,061,811 A * | 12/1977 | Takase et al. | 428/95 |
| 4,850,838 A * | 7/1989 | Wagner et al. | 425/101 |
| 5,007,941 A * | 4/1991 | Martinelli et al. | 8/436 |
| 5,153,067 A | 10/1992 | Yoshida et al. | |
| 5,448,840 A * | 9/1995 | Cheskin | 36/32 R |
| 5,597,515 A | 1/1997 | Kauffman et al. | |
| 5,759,706 A * | 6/1998 | Widdemer | 428/540 |
| 5,906,004 A | 5/1999 | Lebby et al. | |
| 6,533,963 B1 | 3/2003 | Schleifstein et al. | |
| 7,569,160 B2 | 8/2009 | Oldenzijl | |
| 8,062,540 B2 | 11/2011 | Sugimoto et al. | |
| 8,507,102 B1 * | 8/2013 | O'Leary | 428/473 |
| 2002/0035755 A1 * | 3/2002 | Widdemer | 8/94.15 |
| 2004/0144772 A1 | 7/2004 | Qi et al. | |
| 2004/0237170 A1 | 12/2004 | Yamazaki et al. | |
| 2007/0009711 A1 * | 1/2007 | Suto et al. | 428/142 |
| 2007/0154507 A1 | 7/2007 | Patton et al. | |
| 2008/0199665 A1 | 8/2008 | Slater et al. | |
| 2009/0221748 A1 * | 9/2009 | Coca et al. | 525/55 |
| 2010/0090966 A1 * | 4/2010 | Gregorio | 345/173 |
| 2010/0206863 A1 * | 8/2010 | Ritter | 219/202 |

FOREIGN PATENT DOCUMENTS

| | | | |
|---|---|---|---|
| GB | 580121 | | 8/1946 |
| GB | 1063822 A | * | 3/1967 |
| JP | 1953-92 | | 1/1953 |
| JP | 2005-331500 | | 12/1993 |
| JP | H05331500 A | | 12/1993 |
| JP | H0987549 | | 3/1997 |
| JP | 2001-0495594 | | 2/2001 |
| JP | 2008-260938 | | 10/2008 |
| WO | 2010141743 A1 | | 12/2010 |

OTHER PUBLICATIONS

International Search Report, PCT/US2010/037286, dated Nov. 5, 2010, 3 pages.
International Preliminary Report on Patentability & Written Opinion, PCT/US2010/037286, dated Dec. 6, 2011, 8 pages.
Supplementary European Search Report, EP10784111, dated Jun. 10, 2013, 3 pages.
Examination Report for British Patent Application No. GB1121792.4, dated Apr. 27, 2012, 2 pages.
Pocket Book for the Leather Technologist: BASF Performance Chemicals, Jan. 22, 2007, 2 pages.
Examination Report for British Patent Application No. GB1121792.4, dated Jul. 10, 2012, 2 pages.

* cited by examiner

MATERIAL FOR USE WITH A CAPACITIVE TOUCH SCREEN

CROSS-REFERENCE TO RELATED APPLICATIONS

This application is a continuation application of and claims priority to PCT/US2010/037286 with an international filing date of Jun. 3, 2010 entitled "Material for use with a capacitive touch screen" which claims the benefit of U.S. Provisional Patent Application Ser. No. 61/217,653 entitled "A Glove" filed Jun. 3, 2009, U.S. Provisional Patent Application Ser. No. 61/240,934 entitled "Material for use with a capacitive touch screen" filed Sep. 9, 2009, U.S. Provisional Patent Application Ser. No. 61/266,840 entitled "Material for use with a capacitive touch screen" filed Dec. 4, 2009, and U.S. Provisional Patent Application Ser. No. 61/285,468 entitled "Material for use with a capacitive touch screen" filed Dec. 10, 2009, the disclosures of which are incorporated herein by reference in their entirety.

FIELD OF THE EMBODIMENTS

The described embodiments relate generally to a modified material that is capable of operating a capacitive touch screen. The material is impregnated with a composition comprising either a metallic or a non-metallic conductive agent and a binder. More particularly, the described embodiments relate to a conductive glove or a glove that is capable of coupling to a capacitive touch screen.

BACKGROUND

In recent years the development and manufacture of electronic devices using a touch screen as the human input interface has grown exponentially. Multi-touch mobile phones and handheld devices are becoming ever popular. The new multi-touch capacitive touch screen is quickly becoming the dominant type of technology used by manufacturers of these devices, as can be seen with the success of Apple Computer's iPhone, iTouch, and iPad. Many other manufacturers have also adopted the use of multi-touch capacitive touch screens as to enable human interface without need of a stylus, keyboard or mouse. Touch screens also play a prominent role in the design of digital appliances such as the personal digital assistant (PDA), satellite navigation devices, mobile phones, video games, automatic teller machines (ATMs) and even light switches. However, the user cannot interface with these multi-touch devices, as intended, when the user of the device is wearing gloves or is otherwise unable to touch the screen with their skin. This can particularly be a problem in, for example, northern or southern hemisphere countries when the weather is colder. However, even for short periods of cold weather, like during skiing, the operation of touch mobile devices is a problem. Additionally, certain occupations require or suggest the use of gloves to protect the hands from injuries, such as contractors, product delivery drivers, military and public safety personnel. There are also certain transportation and recreational activities where the use of gloves might be used, such as, golfers, motorcycle riders and gardeners, who desire to operate their touch devices.

A popular form of the touch device includes a touch screen which operates in a capacitive mode. For the capacitive system, a layer that stores electrical charge is placed on the glass panel of the monitor of the touch screen devices. This is a form of capacitive coupling between the user and the capacitive touch screen. This decrease is measured by circuits located at each corner of the monitor. A processor of the touch screen device calculates, from the relative differences in charge at each corner, exactly where the touch event took place and then relays that information to the touch-screen driver software.

The problem surrounds the fact that capacitive touch screens rely upon an electrical response (transfer of charge or capacitive coupling) from or to the user's body. Gloves and prosthetic devices, unsurprisingly, prevent the electrical charge from passing through to the screen. Therefore, one is required to remove a glove whenever activating the device, like making a phone call, sending a text a message, checking email, or operating any other touch screen device.

There is a need for a material that provides a user with the typical benefits provided by gloves, but additionally allows the user to operate a touch-screen device without having to remove the glove or otherwise put their skin in contact with the touch screen. More particularly to enable the material, itself, to capacitively couple with touch screen devices by use of an electrostatic discharge enabling interaction with such devices without the need of human skin contact for such capacitive coupling. Such a material would allow someone who might have lost a finger, hand or limb and has a prosthetic in its place to use touch screen devices as modern prosthetics are not designed to enable capacitive coupling to these capacitive touch screens.

Various attempts have been made to produce hand protection that allows interaction of such devices without removing the gloves. None of these solutions provide sufficient protection from chemicals, weather or other potentially harmful situations, nor allow use of the ten finger gesturing capabilities of the newer touch screens.

Accordingly, there is a need for a new type of performance leather that replicates the human touch, without the actually need to capacitively couple to the human body, in order to enable the use of these devices without having to remove the glove.

SUMMARY

In order to properly operate a capacitive touch screen device with gloves on or without the ability to contact human skin and without the use of a device, such as a stylus or other embodiment specifically created for this purpose, the glove or other material must provide enough electrical capacity to operate the touch screen. Materials of this invention provide the requisite electrical capacity to perform in such a manner, thereby allowing for operation of the touch screen absent human conductive coupling to the device.

In one embodiment, the invention is directed to a modified material comprising a material where at least a portion of which is impregnated with a composition comprising a non-metallic electrically conductive agent and a binder at a sufficient concentration of the conductive agent to provide electrical conductivity in that portion of the impregnated material. In another embodiment, the material is impregnated in at least a portion thereof with a metallic electrically conductive agent. In another embodiment, the material is textile, leather, non-woven material, or a leather-like material. In another embodiment, the material has a volume resistivity of less than about $1.0 \times 10^6$ Ohm-cm or less than about $1.0 \times 10^5$ Ohm-cm, or less than about $1.0 \times 10^4$ Ohm-cm, or less than about $1.0 \times 10^3$ Ohm-cm or less than about $1.0 \times 10^2$ Ohm-cm.

The invention is also directed to a method of operating a capacitive touch screen by placing the modified material of the invention in proximity to the touch screen in a manner that allows for operation of the touch screen.

In one embodiment, a glove comprises the modified material described above. In another embodiment, a user wearing the glove may operate a capacitive touch screen. In some embodiments, the glove is comprised of the modified material such that the user can take advantage of "Ten Touch" touch screen devices, which utilize all ten fingers being in contact with the screen at the same time in order to solicit a specific response from the multi-touch touch screen devices.

Also provided is a leather product, either black or colored, having a volume resistivity of less than about $1.0 \times 10^6$ Ohm-cm. In some embodiments, the volume resistivity is from about $1.0 \times 10^3$ Ohm-cm to about $1.0 \times 10^4$ Ohm-cm.

One additional embodiment includes a conductive glove. The conductive glove optionally includes a liner, wherein the liner is less than 1 mm thick and/or has a volume resistivity of less than $1.0 \times 10^6$ Ohm-cm. The conductive glove further includes an electrically conductive thermal insulator layer adjacent to the liner, and optionally an outer shell adjacent to the electrically conductive insulating layer, wherein the outer shell is optionally less than 1 mm thick and/or has a volume resistivity of less than $1.0 \times 10^6$ Ohm-cm.

Another embodiment includes a further iteration of a conductive glove. In this iteration, the conductive glove includes an outer shell. The outer shell includes at least one conductive channel, wherein at least one the conductive channel extends from an inner surface of the outer shell to an outer surface of the outer shell, and the conductive channel has a volume resistivity of less than $1.0 \times 10^6$ Ohm-cm.

In one embodiment, at least one of the fingers or the pad of the fingers of the glove are impregnated with a non-metallic or metallic electrically conductive agent and a binder at a sufficient concentration of the conductive agent to provide electrical conductivity in to the fingers of the glove.

In another embodiment, the entirety of the glove is impregnated with a non-metallic or metallic electrically conductive agent and a binder at a sufficient concentration of the conductive agent to provide electrical conductivity in to the entirety of the glove.

Other aspects and advantages of the described embodiments will become apparent from the following detailed description, taken in conjunction with the accompanying drawings, illustrating by way of example the principles of the described embodiments.

DETAILED DESCRIPTION

Prior to discussing the invention, all numerical designations, e.g., pH, temperature, time, concentration, and molecular weight, including ranges, are approximations which are varied (+) or (−) by increments of 5%. It is to be understood, although not always explicitly stated that all numerical designations are preceded by the term "about". It also is to be understood, although not always explicitly stated, that the reagents described herein are merely exemplary and that equivalents of such are known in the art.

It must be noted that as used herein, and in the appended claims, the singular forms "a," "an," and "the" include plural references unless the context clearly dictates otherwise.

Unless defined otherwise, all technical and scientific terms used herein have the same meanings as commonly understood by one of ordinary skill in the art to which this invention belongs. Although any methods and materials similar or equivalent to those described herein can be used in the practice or testing of the present invention, the preferred methods, devices, and materials are now described. All publications cited herein are incorporated herein by reference in their entirety for the purpose of describing and disclosing the methodologies, reagents, and tools reported in the publications that might be used in connection with the invention. Nothing herein is to be construed as an admission that the invention is not entitled to antedate such disclosure by virtue of prior invention.

As used herein, the term "comprising" is intended to mean that the compositions and methods include the recited elements, but do not exclude others. "Consisting essentially of" when used to define compositions and methods, shall mean excluding other elements of any essential significance to the combination for the intended use. Thus, a composition consisting essentially of the elements as defined herein would not exclude trace contaminants from the isolation and purification methods of the components of the compositions disclosed herein. "Consisting of" shall mean excluding more than trace elements of other ingredients of the compositions of this invention. Embodiments defined by each of these transition terms are within the scope of this invention.

Materials

The invention is directed to, in part, a modified material comprising a material where at least a portion of which is impregnated with a composition comprising a non-metallic electrically conductive agent and a binder at a sufficient concentration to provide electrical conductivity in the impregnated material. What is meant by the term "impregnate" is that the material is somehow filled or infused with the composition. In some embodiments, the material is coated with the conductive agent without the use of an adhesive layer. In other embodiments, the composition fills voids or interstices of the material. This can be accomplished in a variety of ways, including but not limited to spraying, roll coating, screen printing, brushing, sponging, dipping, drying, curing, soaking, rinsing, or combinations of a variety of treatments and the like. For example, the composition may be applied to a material by spraying and then drying the material with or without heat. This is more thoroughly described in the next section.

It is contemplated that the materials of the invention may include, but are not limited to, textiles, leathers, non-woven materials, and leather-like materials. It is contemplated that the materials of the invention comprise some voids or interstices to allow for effective impregnation of the conductive agents. These materials may include, but are not limited to, leather, faux leather, suede, faux suede, polymer, wool, cotton, fur, nylon, fleece (including microfleece), fabric, cloth, woven and knitted materials, polyester, nylon, synthetic fabrics, rubber, latex, neoprene and the like.

As used herein the term "conductive agent," also referred to herein as "electrically conductive" filler material, refers to an agent that is electrically conductive. In some embodiments, the agent is biocompatible, meaning it is compatible with human tissue. In certain embodiments, the conductive agent comprises conductive particles and/or conductive fibers. The "non-metallic conductive agents" include, but are not limited to, carbon black, carbon nanotubes, graphite, PEDOT, and combinations thereof. In certain embodiments, the conductive agent comprises carbon fiber chains with at least some of the carbon fiber chains having a length of greater than 100 nanometers. In other embodiments, the agent is long chain carbon black.

The non-metallic conductive agent may also be a polymer. Representative polymers include poly(acetylene)s, poly(pyrrole)s, poly(thiophene)s, polyanilines, polythiophenes, poly(p-phenylene sulfide), and poly(para-phenylene vinylene)s (PPV), polyindole, polypyrene, polycarbazole, polyazulene, polyazepine, poly(fluorene)s, and polynaphthalene and combinations thereof.

The term "metallic conductive agents" refers to a variety of conductive metals. Those metals include silver, copper, gold, nickel, aluminum, indium, zinc, tin, tantalum, magnesium, sodium, beryllium, barium, cadmium, calcium, rubidium, cesium, lithium, molybdenum, cobalt, uranium, chromium, manganese, iron, platinum, tungsten, osmium, titanium, iridium, ruthenium, nickel, rhodium, palladium, steel, thallium, lead, niobium, vanadium, arsenic, antimony, mercury, bismuth, tellurium and combinations or alloys thereof. In certain embodiments, the metallic agent may be selected from the group consisting of silver, copper, gold, nickel, aluminum, indium, zinc, tin, and combinations or alloys thereof.

Whether employing a metallic or non-metallic conductive agent, the conductive agent may serve as a coating to another particle or fiber. For example, silver-coated glass beads and silver-coated fiberglass are useful in materials of the invention. Further, it is also contemplated that a combination of conductive agents may be used. For example, silver-coated glass beads can be used in conjunction with carbon black.

The amount of conductive agent required can be readily determined by one of skill in the art based on the conductivity of the agent selected. For example, it is contemplated that for some conductive agents, the modified material will be comprised of at least about 30% (w/w) of conductive agent. For example, it is contemplated that for some conductive agents, the modified material will be comprised of at least about 5% (w/w) of conductive agent. When selecting the amount of conductive agent, the desired conductivity should be considered. For example, the modified materials of the invention have a volume resistivity of less than about $1.0 \times 10^6$ ohm-cm or less than about $3.0 \times 10^5$ ohm-cm or less than about $1.0 \times 10^5$ ohm-cm or less than about $1.0 \times 10^4$ ohm-cm or less than about $1.0 \times 10^3$ ohm-cm. Further, the modified material retains similar volume resistivity after any pre-commercialization treatments, such as stretching, bending, deforming and the like. It is also contemplated that the materials of the invention retain their conductivity after being used for about 1 month or longer. It is contemplated that the modified material of the invention retains its conductivity for at least about 6 months or at least a year or longer.

In other embodiments, the conductive agent is substantially homogeneously dispersed or suspended with a binder. Any number of suitable binders will suffice and can be readily determined by one of skill in the art based on material on which it is being applied. The composition may also optionally comprise aqueous polyether polyurethanes, solvent-borne polyether/polyester, aqueous acrylics, styrene butadiene rubber, nitrocellulose lacquers and water emulsions, cellulose acetate butyrate lacquers and water emulsions, shellac, epoxy, polyvinyl chloride, oils, waxes, silicones, and/or combinations thereof. Additional components include dyes and pigments, ionic additives, pH balancers, fastness agents, water, adhesion promoters, bonding agents, aromatic polyurethanes, aliphatic polyurethanes, carriers including resins, binders, cross-linking agents, acrylics, UV protective additives, feel enhancers, and the like.

In certain embodiments the material optionally has any number of additional coats, such as for example, a base coat, a midcoat, a color coat, and a top or finishing coat. The additional components may be in any number of additional coats just described. Further, the composition comprising the conductive agent can be applied in a base coat, a midcoat, color coat, and/or the top coat. In one embodiment, the top coat comprises cellulose acetate butyrate. In one embodiment, the base coat does not contain an adhesive material. In another embodiment, the base coat comprises carbon black as the conductive agent.

One embodiment of the present invention is directed to a leather which has been impregnated with a capacitive material, such as carbon black, that allows the flow of electrons in the form of an electrostatic discharge in order to operate touch screen devices.

In one embodiment, the present invention provides a process for tanning leather for use in gloves or garments with the unique ability to discharge static electricity, which can be harmful to electronic devices.

Another embodiment of the present invention is directed to a tanned leather which consists of a collagen based internal fiber matrix, made up of the grain, corium-grain junction, the corium and a plurality of capacitive particles creating a conductive network throughout the material, or portions or layers thereof. The capacitive particles, are embedded within the fiber matrix and/or are on the surface of the leather, providing a conductive network throughout the material. In sufficient amount, the capacitive material will create an electrostatic discharge (ESD), comparable to that of the human body, enabling the leather to drive the software on capacitive or other types of touch screen devices without the need for coupling to human skin/body.

Another embodiment of the present invention is directed to leather products formed of such leather, such as garments, shoes, gloves, wallets, purses, furniture, shelters or other such applications where the end product would be real leather, with the unique performance ability to discharge static electricity or create an electromagnetic interference (EMI), for blocking certain bands of radio transmissions and absorption of radio frequencies.

A further embodiment of the present invention is directed to a method of impregnating a material having an internal or external fiber matrices for the purpose of providing additional performance capabilities not normally found in such substrates as currently processed. The methods comprise the steps of placing the material in a container, adding a tanning agent to the container, adding a plurality of capacitive particles with a liquid to form a suspension, and adding the suspension to the container and agitating the contents of the container until the capacitive particles are embedded throughout the fiber matrices. A sufficient enough amount of the capacitive material is embedded so that the particles create a pathway for the electrons to discharge into providing the capacitive coupling without the need for human skin contact. In the method, the material can be either raw skins or tanned leather.

Yet a further embodiment of the present invention is directed to a method of impregnating a material through the use of a finishing system. The finishing system could be any of, including combinations of a water or solvent based leather finishing system, dye coat, or other such systems, which carry the conductive particles onto and/or into the fiber matrices, or coat the surface of the leather, in a high enough concentration, to create a conductive network along the surface and/or through the volume of the leather, to create a capacitive coupling, electrostatic discharge, or electromagnetic interference.

Leather Materials

The invention is also directed to leather products, including, but not limited to, black leather products and colored leather products that are electrically conductive. The term "colored leather" refers to white, red, magenta, cyan, black, yellow and any combinations thereof. The leather products or materials of the invention may be created in the following method. For lighter colors, such as white leather, it is contemplated that a capacitive titanium dioxide material can be used, such as fluorine or zinc-doped titanium dioxide, such as that disclosed in U.S. Pat. No. 5,597,515 (Kauffman, et al., issued Jan. 28, 1997) which is herein incorporated by reference in its entirety.

A tanned leather (crust) is obtained. This leather may be tanned with conventional tanning agents, including chromium and or aluminum salts, vegetable based tannins, etc. The tanned leather is then colored by tumbling in a tumbling drum, using one or more of the following in solution: dyes, ionic additives, pH balancers, fastness agents, and/or water.

Once the coloring process is complete, the leather is toggled. Toggling involves stretching the leather while wet to some percentage of the maximum stretch to which the leather can accept. For the leather materials of the current invention, the leathers are toggled to between 25% and 75% of the maximum toggling, and preferably to 50% of the maximum toggling. While stretched (toggled), the leather material is then dried, after which the dried leather is removed from the stretching fixture.

The leather material is then optionally coated with a base coat. Said base coat comprises one or more of the following: (1) electrically conductive filler material (for example carbon black particles such as long chain carbon black particles, silver particles, silver coated silicates, silver coated copper particles, copper particles, nickel, tin, or aluminum particles or coated particles, conductive or coated fibers or particles, etc.); (2) adhesion promoters; (3) bonding agents; (4) paints or other coloring agents; (5) aromatic polyurethane; (6) aliphatic polyurethane; (7) other carriers, including but not limited to resins, binders, cross linking agents, acrylics, etc.

This coating process is typically accomplished by spraying said coating onto the leather surface, and said additives and binders cause said base coat to bond to said leather material. Said long chain carbon black forms long chain-like electrically conductive pathways within the coating layer and the surface of the porous base leather material in such a manner that said coated leather material maintains its conductivity and capacitance when said leather material is bent, stretched, or otherwise deformed. The coating is then cured (dried) either under heat or air dried without heat. The resulting coating is both electrically conductive (with an electrical conductivity below about $1.0 \times 10^6$ Ohm-cm and chemically and/or mechanically bonded to the leather material.

A mid-coat optionally is then applied, comprising one or more of the following: (1) aromatic polyurethane; (2) aliphatic polyurethane; (3) conductive fillers and/or (4) water.

This mid-coat is cured with or without heat. Said mid-coat is applied with electrically conductive fillers in such a concentration and in such a manner that said conductive fillers form conductive pillar structures that bridge the thickness of said mid-coat, providing electrically conductive continuity between the surface of said mid-coat and said base coat.

A finish, or top, coat is then applied to the leather material to further condition the material by adding abrasion resistance, water proofing, fire resistance, look and feel enhancement etc. A suitable water-proofing agent to be used includes TFL-DRYWALK® (1% by dry weight). A suitable fire resistance agent to be used includes bromine salts, such as FLAMEPROOF fire retardants (FLAMEPROOF 1694, Apexical, Inc. Spartenburg, S.C.). It is contemplated that the modified material can be formulated with such fire retardants such that the material can withstand temperatures of up to about 1400 degrees Fahrenheit or about 1500 degrees Fahrenheit or greater. Such reagents can be added to the leather or fabric during the tanning, coloring and/or finishing process. The finish coating may be comprised of one or more of the following constituents: polyurethanes; acrylics; binders; look and feel enhancers; waxes; silicones; electrically conductive fillers; UV protective additives; penetrating polymers, and/or water.

This coating may be applied very lightly to ensure electrical conductivity with and/or electrical capacitive coupling to the base coating. Alternately, the finish coating may be loaded with conductive fillers in such a manner that said electrically conductive fillers form electrically conductive pillars, or electrically conductive pathways, between the outer surface of said finish coat and said electrically conductive mid- and base coatings.

The leather material then undergoes a final curing step in which the finish coating is cured, typically with heat, but alternately without heat. After the final coating the leather is milled, by tumbling the leather material in a tumbler to restore flexibility, softness, and/or suppleness.

Although the above method is specifically used for leather materials, the coatings and coating processes may be used on other materials such as artificial leathers, and woven or non-woven fabric textiles such as cotton, polyester fiber, nylon fiber, vinyl fiber, silk, wool, lyocell, or other natural or artificial fibers.

The above described method of the invention produces a leather or other material that is highly conductive, with a volume resistivity below about $1.0 \times 10^6$ Ohm-cm, and/or has a capacitance approximately equivalent to that of the human body. This capacitance may be as low as 10 pico-Farads (pF), or higher, such as about 50 pF, or about 100 pF, or about 200 pF, or about 300 pF, or about 400 pF, or about 500 pF with respect to a distant ground. In some embodiments, the capacitance is between about 10 pF and about 50 pF, or between about 10 pF and about 500 pF, or between about 50 pF and about 500 pF.

The electrically conductive and capacitive materials of the invention may be then used in conventional or non-conventional methods to produce garments and various products, such as gloves, jackets, shirts, pants, coats, body suits, wet suits, boots, socks, hats, other clothing items, backpacks, belts, straps, bags, parachutes, upholstery, bedding, curtains, carpeting, computer bags, travel bags, duffel bags, etc.

The finished conductive and/or capacitive leather material of the invention exhibits several functional, morphological, and structural characteristics. The first of said functional characteristics is said leather material's low electrical resistivity, as measured between two points on the coated surface of said leather material. The electrical resistivity of said coated leather material may be expressed as a surface resistivity or as a volume resistivity. The surface resistivity of the leather material of the invention is less than $1.0 \times 10^6$ Ohm/square, and the volume resistivity is less than $1.0 \times 10^6$ Ohm-cm.

The next of said functional characteristics is said leather material's high capacitance with respect to a distant ground. The capacitance of said electrically capacitive leather material is greater than 10.0 pF.

The next of said functional characteristics is said leather material's ability to maintain said low electrical resistivity and high capacitance when said leather material is stretched, twisted, bent, wrinkled, abraded, etc., without significant degradation to said electrical properties.

Without being limited to any one theory, it is contemplated that the above-mentioned functional characteristics are a result of one or more of the following morphological and structural characteristics. The first of said morphological and structural characteristics is penetration of the base coat into the porous and/or fibrous surface of said leather material. During the coating process, one or more solvents, carriers, surfactants, polymers, or other liquids carries the electrically conductive particles and/or fibers into the porous surface of said leather material. During the ensuing curing process, one or more of said solvents, carriers, surfactants, polymers or other liquids evaporates and or cross links, and/or cures, leaving the interstitial porous structure of said leather material substantially filled with said electrically conductive particle and/or fiber material. Additionally, one or more polymers, waxes, fillers, binders, adhesives, or other materials may remain with said electrically conductive material in said porous or fibrous structure of said leather material after curing. This interstitially penetrated material combination forms a matrix of said electrically conductive materials, said binders, adhesives, polymers, waxes, etc. that is electrically conductive, possesses a capacitance with respect to a distant ground, and not easily removed from the surface of said leather material.

It is contemplated that the base and/or the mid coats provide this matrix which penetrates the leather grain or flesh such that the electrically conductive materials are sufficiently dispersed throughout the thickness of the leather. This dispersion allows the leather to retain its capacitive function in the event that the leather is worn down or damaged in some way.

The next of said morphological and structural characteristics is the existence of a dense layer of electrically conductive material, such as carbon black, on the surface of the coated base layer of said leather material. The electrically conductive material in said base layer may be of sufficient concentration, buoyancy, surface tension, or other property to allow said electrically conductive material to form a surface layer during the spray coating and/or curing process. Said surface layer acts as a highly electrically conductive layer on said leather material, enabling both low electrical resistivity and high electrical capacitance.

The next of said morphological and structural characteristics is the existence of pillar like structures of conductive particles and/or fibers within one or more of the coating layers of said electrically conductive and capacitive leather material. During the coating and/or curing process, said electrically conductive particles and/or fibers in said coating form closely packed structures within said coating layer such that electrical pathways are formed which span the thickness of said coating, creating matrix of electrically conductive pathways from the surface of said coating to the base of said coating. In this manner said coating may contain a dielectric binder, such as polyurethane, and a conductive filler, such as carbon black, and maintain a very low electrical resistivity once said coating and curing processes are complete.

The next of said morphological and structural characteristics is the existence of electrically conductive fibers and/or electrically conductive particles, within one or more of the coating layers of said finished leather material. Said long fibers (for example long chain carbon black, or silver coated polymer fibers) form a structure within said coating layer or layers in which said fibers and or particles overlap one another in such a manner that said coating may undergo tensile, compressive, or shear strains (deformations) without suffering significant loss of electrical conductivity. As the leather material and the coating layer are deformed, said fibers and/or particles may experience small amounts of relative displacement yet maintain sufficient electrical conductivity so that said overall leather material continues to maintain the desired electrical conductivity and capacitance.

In one exemplary embodiment of the invention, described here, a black colored leather material is produced with a volume resistivity of between $1.0 \times 10^3$ and $1.0 \times 10^4$ Ohm-cm, and a capacitance relative to a distant ground of between 50 pF and 500 pF. A tanned cattle leather is taken, having been tanned in a conventional leather tanning process using chromium salts. Said tanned leather is then colored in tumbling drum using a solution of carbon black leather pigment, water, ionic additives, and pH balancers. Other chrome tanning processes or even other basic mineral or vegetable tanning processes can be utilized as the preliminary tanning method. Chromium sulfate, zirconium, aluminum and vegetable tannages may also be utilized with the present invention.

Said leather is then removed from the tumbling drum and toggled to 50% of its maximum stretch, or toggle. Said toggled leather is dried while in this toggled state using a heater to accelerate the drying process.

Said toggled and dried leather is then removed from the toggling fixture and a base coat is applied, said base coat comprising:

| | |
|---|---|
| 160 parts | aliphatic polyurethane and optionally a binder |
| 160 parts | water |
| 60 parts | Butyl Cellosolve Acetate |
| 72 parts | long chain conductive carbon black particles |
| 84 parts | carbon black based leather pigment |

Said base coat is sprayed onto the surface of said leather in such a manner as to uniformly and thoroughly coat said leather material. Said coated leather material is then cured, using heat to accelerate the curing process.

A mid-coat is then applied to said coated leather, said mid-coat comprising:

| | |
|---|---|
| 1 part | Aliphatic Polyurethane optionally with binder |
| 1 part | Aromatic Polyurethane optionally with binder |
| 1 part | water. |

Said mid-coat is applied to said coated leather in a spray coating process to evenly and thoroughly coat said leather material. Said leather with said mid-coat is cured with heat to accelerate the curing process.

A finish coat is then applied to said coated and cured leather material, said finish coat comprising:

| | |
|---|---|
| 200 parts | Cellulose Acetate Butyrate |
| 100 parts | water |
| 18 parts | Waxy feel enhancer |

Said finish coat is applied to said coated leather material in a spray coating process to evenly and thoroughly coat said leather material. Said leather with said finish coat is cured with heat to accelerate the curing process.

Finally, said coated leather is milled by tumbling said coated and cured leather in a tumbler to restore flexibility and suppleness to said leather material.

In a second exemplary embodiment of the invention, described here, a red colored leather material is produced with a volume resistivity of between $1.0 \times 10^1$ and $1.0 \times 10^5$ Ohm-cm, and a capacitance relative to a distant ground of between 50 pF and 500 pF. A tanned cattle leather is taken, having been tanned in a conventional leather tanning process using chromium salts. Said tanned leather is then colored in tumbling drum using a solution of carbon black leather pigment, water, ionic additives, and pH balancers.

Said leather is then removed from the tumbling drum and toggled to 50% of its maximum stretch, or toggle. Said toggled leather is dried while in this toggled state using a heater to accelerate the drying process.

Said toggled and dried leather is then removed from the toggling fixture and a base coat is applied, said base coat comprising:

| | |
|---|---|
| 66.6 parts | Aliphatic polyurethane optionally with a binder |
| 160 parts | water |
| 60 parts | Butyl Cellosolve Acetate |
| 3.33 parts | Ashbury 5303 long chain conductive carbon black |
| 30 parts | Silver coated glass beads. |

Said base coat is sprayed onto the surface of said leather in such a manner as to uniformly and thoroughly coat said leather material. Said coated leather material is then cured, using heat to accelerate the curing process.

A color coat is then applied to said coated and cured leather material, said color coat comprising:

| | |
|---|---|
| 10 parts | Aliphatic Polyurethane and optionally a binder |
| 5 parts | Red color pigment |
| 10 parts | Silver coated glass beads |
| 1 part | Long chain conductive carbon black |
| 10 parts | water. |

Said color coat is applied to said coated leather in a spray coating process to evenly and thoroughly coat said leather material. Said leather with said color coat is cured with heat to accelerate the curing process.

A mid-coat is then applied to said coated leather, said mid-coat comprising:

| | |
|---|---|
| 10 parts | Aliphatic Polyurethane optionally with binders; |
| 10 parts | Aromatic Polyurethane optionally with binders; |
| 10 parts | Silver coated glass beads; |
| 1 part | Long chain conductive carbon black; and |
| 10 parts | water. |

Said mid-coat is applied to said coated leather in a spray coating process to evenly and thoroughly coat said leather material. Said leather with said mid-coat is cured with heat to accelerate the curing process.

A finish coat is then applied to said coated and cured leather material, said finish coat comprising:

| | |
|---|---|
| 200 parts | Cellulose Acetate Butyrate |
| 100 parts | Silver coated glass beads |
| 10 parts | Long chain conductive carbon black |
| 100 parts | water |
| 18 parts | Waxy feel enhancer |
| 10 parts | UV protective additive |

Said finish coat is applied to said coated leather material in a spray coating process to evenly and thoroughly coat said leather material. Said leather with said finish coat is cured with heat to accelerate the curing process.

Finally, said coated leather is optionally milled by tumbling said coated and cured leather in a tumbler to restore flexibility and suppleness to said leather material. Such material is referred to herein as "finished", or being in "finished form".

Other Materials

It is further contemplated that similar procedures could be used on vinyl resins using standard vinyl manufacturing processes which typically employ vinyl and plasticizers. The vinyl and plasticizers are stirred together in a vat and then mixed with AZO compound (having carbon and nitrogen) and heated to make a foam with the consistency of pancake batter. Silver, copper, nickel and/or carbon black power may then be added to the base polymer along with other pigments. This slurry may then be poured onto an appropriate backing sheet, such as felt, fleece (microfleece), suede or a velvet-like napped surface to provide strength and flexibility. This may then be put through a reverse roll coater machine, heated in an oven until the vinyl resin absorbed the plasticizers and started to set. Then the sheets may be run through a printing press with plates that were designed to imprint the texture or grain of leather into the vinyl material. If further coloring were desired, additional sprays of colorants may be added in a manner that does not affect the conductivity. In some embodiments, the modified material is produced using yarn wherein at least a portion of the yarn is capacitive yarn. In some embodiments, the modified material which comprises capacitive yarn is not further treated or coated with conductive material. In another embodiment, the modified material which comprises capacitive yarn is woven such that the material has a uniform conductivity throughout the material.

Woven or knitted materials can be impregnated with a conductive material, such as metal oxides, metal fibers or a carbon-black based material. The impregnation step is such that the conductive material is used to fabricate a bolt of capacitive fabric. For example, the conductive fibers are blended with an organic or inorganic material, such as cotton, nylon, polyester and the like, to form a capacitive yarn. The capacitive yarn is then woven or knit with a non-capacitive yarn which can be either an organic or inorganic material, such as cotton, nylon, polyester and the like, to form a capacitive fabric.

Suitable conductive materials to be used in the capacitive yarn are Thunderon® (Static Faction, Inc.) which is an organic fiber of copper sulfide chemically bonded to acrylic and nylon fibers, SHIELDEX metalized yarns and conductive sewing threads which are silver-based, and Resistat® (Jarden Applied Materials) which is a nylon fiber with electrically conductive carbon particles which become part of the structure of the fiber. Ideally, with the conductive yarn would retain the strength and flexibility of the organic or inorganic yarn material while maintaining excellent conductivity.

In the woven or knitted capacitive fabric, the capacitive yarn should account for at least about 0.6 to about 23% of the yarn in the fabric and should result in a surface resistivity of at least about $3 \times 10^5$ Ohm/cm. This amount depends on the type of conductive material used. For example, when a highly conducive material, such as the silver-based yarn, is used the amount of conductive yarn required would be less. However, when a carbon-based yarn is used, a higher percentage may be required to achieve the desired resistivity. For example, a capacitive material can be made by weaving or knitting a bolt of fabric using 85% non-capacitive thread (e.g. polyester) with 15% capacitive thread (e.g. Resistat®). The capacitive thread would thus be uniformly distributed throughout the conductive woven or knitted fabric. Therefore, a garment such as a glove made from the above-described conductive fabric would be capacitive throughout the garment. Additionally, the conductive fabric as disclosed herein can be laundered multiple times (i.e. more than 10 times, or more than 50 times, or more than 100 times) in a standard wash/dry cycle without any observable depletion in the conductive properties.

The conductive fabric is designed to interact with touch screen devices and can be used to make a garment such as a glove for use with a touch screen device. However, the conductive coupling of the touch screen is to the conductive material, not to a hand or body part in contact with the conductive material. In some embodiments, the glove will still operate the touch screen device without a human hand inside the glove. Therefore, a glove made from the conductive fabric as disclosed herein can be used by an amputee.

In one embodiment, the modified material has a volume resistivity of less than about $3.0 \times 10^5$ Ohm-cm, or alternatively, less than about $3.0 \times 10^6$ Ohm-cm, or alternatively, less than about $1.0 \times 10^6$ Ohm-cm and/or a surface resistivity of less than about $3.0 \times 10^5$ Ohm-cm, or alternatively, less than about $3.0 \times 10^6$ Ohm-cm, or alternatively, less than about $1.0 \times 10^6$ Ohm-cm.

Glove Embodiments

The modified materials of the invention may be used in a number of capacities as described above allowing a user to operate a capacitive touch screen. Briefly stated, provided is a modified material which comprises electrically conductive material and/or chemical treatments, to enable a capacitive coupling to Capacitive and Projected Capacitance Touch Screen devices and any other types of touch screen devices, regardless of the touch screen technology used. The modified material provides for either a projected capacitance of the human body through the material to the interface, or a direct capacitive coupling to the textile itself, thereby not requiring human contact to operate the touch screens or touch pads. The modified material can be fabricated into a functional article of clothing, such as a glove or other item made of a woven or knitted textile so as to increase the functionality of the article of clothing or item made thereof. The conductive material can create a bridge to PCT devices, wherein the conductive material comprises integrated components, or chemical treatments serving as a connection to the devices without the need for the human body to create this capacitive coupling. As shown in the drawings, the described embodiments of the modified material of the invention are embodied in a conductive glove, wherein the conductive glove allows a user of the conductive glove to operate a touch screen device without removing the glove. The gloves of the invention also provide a barrier from certain viruses, bacteria and fungi that can easily be passed from interacting with previously contaminated touch screen surfaces during interaction.

Figure 1:
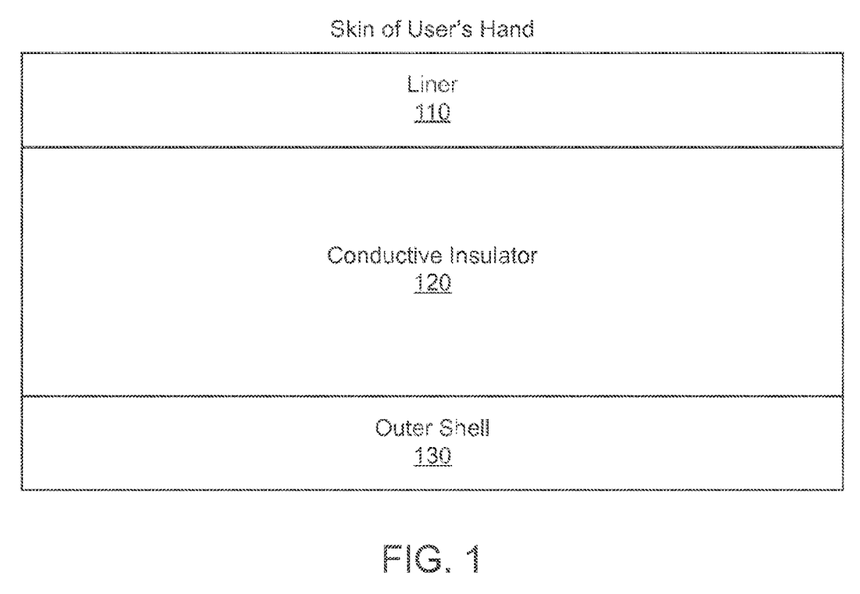
FIG. 1 shows a cross-section of an embodiment of an electrically conductive glove.

FIG. 1 shows a cross-section of an embodiment of an electrically conductive glove. This embodiment includes a liner 110, a conductive insulator 120 and an outer shell 130. It is to be understood that this is a cross-section of at least a portion of the glove. That is, the entire glove is not required to be fabricated as shown. In an application, the glove is worn by a user of a touch screen device. An embodiment includes the portion of the glove that the user uses to control the touch screen device being fabricated as shown by the cross-section view of FIG. 1.

For an embodiment, the liner and outer shell being less than 2 mm or less than 1 mm or less than 0.5 mm thick and/or has a volume resistivity of less than $1.0 \times 10^6$ Ohm-cm and/or a surface resistivity of less than $1.0 \times 10^6$ Ohm-cm. When any material has an electrical volume resistivity level of less than $1.0 \times 10^6$ Ohm-cm or a surface resistivity of less than $1.0 \times 10^6$ Ohm-cm it is widely considered to be in the range of a conductive material. This is desirable because a capacitive coupling with the touch screen is not possible if the non-conductive liner and/or the outer shell is thicker than 0.5 mm and not made of a conductive material.

In order to properly operate a capacitive touch screen device with gloves on, without the use of a device, such as a stylus or other embodiment specifically created for this purpose, the glove itself must provide a capacitive coupling to the human skin. This can be achieved by employing/using material as described throughout that will not block the conductivity to the human skin surface. When a fabric or material is used that is either too thick, or has a volume resistivity of greater than $1.0 \times 10^6$ Ohm-cm and/or a surface resistivity of greater than $1.0 \times 10^6$ Ohm-cm, the results are a material that is electrically dissipative or insulative, not conductive and therefore will not work for this application.

Various embodiments of the liner include at least one of rayon, acetate, nylon, modacrylic, olefin, PLAY polyester, wool, cotton, silk, acrylic, blends or any type of conductive woven fiber blends, metallic fibers or fibers treated with copper, silver, carbon black, carbon fiber, nickel, tin or other conductive material with a thickness of less than 0.5 mm and/or a volume surface resistivity of less than $1.0 \times 10^6$ Ohm-cm and/or a surface resistivity of less than $1.0 \times 10^6$ Ohm-cm.

For an embodiment, the electrically conductive insulator layer is located adjacent to the liner. Additionally, this embodiment includes a resistance of the electrically conductive insulator layer being less than $1.0 \times 10^6$ Ohm-cm.

Embodiments of the electrically conductive thermal insulator layer include a conductive foam, fiber, microfiber, microfilament, plastic, metal, rubber or breathable thermal insulation with a volume resistivity of less than $1.0 \times 10^6$ Ohm-cm and/or a surface resistivity of less than $1.0 \times 10^6$ Ohm-cm.

Configurations of the conductive fiber, microfiber, microfilament or breathable thermal, electrically conductive, thermal insulation include materials made from different mixtures of polymers, but primarily polyethylene terephthalate or a mixture of polyethylene terephthalate and polypropylene. Other materials may include polyethylene terephthalate, polyethylene isophthalate copolymer and acrylic in combination with a conductive coating or impregnated, embedded, compounded or plated conductive material with a surface resistivity of less than $1.0 \times 10^6$ Ohm-cm. This can be accomplished by the use of a chemical reaction to bond the molecules of carbon black, copper, silver, gold, nickel, tin or other conductive metal substances, with the molecules of the host fiber, or by plating or compounding any of these conductive substances to the host fiber.

Other embodiments of the electrically conductive insulator layer include a conductive foam, rubber, fiber, microfiber or microfilament.

For an embodiment, the outer shell is formed adjacent to the electrically conductive insulating layer. Additionally, this embodiment includes the outer shell being less than 2 mm thick and/or having a volume resistivity of less than $1.0 \times 10^6$ Ohm-cm.

This is desirable because a capacitive coupling with the touch screen is not possible if the non-conductive liner and/or the outer shell is thicker than 0.5 mm and not made of a conductive material.

In order to properly operate a capacitive touch screen device with gloves on, without the use of a device, such as a stylus or other embodiment specifically created for this purpose, the glove itself must provide a capacitive coupling to the human skin. This can be achieved by employing or using key types of fabrics or other materials that will not block the conductivity to the human skin surface. When a fabric or material is used that is either too thick, or has a volumetric and/or surface resistivity of greater than $1.0 \times 10^6$ Ohm-cm, the results are a material that is electrically dissipative or insulative, not conductive and therefore will not work for this application.

Embodiments of the outer shell include rayon, acetate, nylon, modacrylic, olefin, PLA, polyester, wool, cotton, silk, acrylic, blends or any type of conductive woven fiber blends; metallic fibers or fibers treated with copper, silver, carbon black, carbon fiber, nickel, tin, other conductive material, animal skin, vinyl, rubber, latex or silicone.

The embodiment of FIG. 1 can be fabricated by using a piece of fabric made of wool, cotton or silk as a liner, for instance, and securing it to a layer of electrically conductive thermally insulative foam, or electrically conductive thermally insulative microfiber insulation, for instance, and securing the insulation to the outer shell. When all components of the glove meet the specifications of both thickness and conductivity. By simply pressing the skin firmly against the three layers of material will produced the desired results of creating a capacitive coupling through the dielectric and conductive surfaces to the touch screen device and allows the user to use the device as if they were touching the device with their bare skin.

Figure 2:
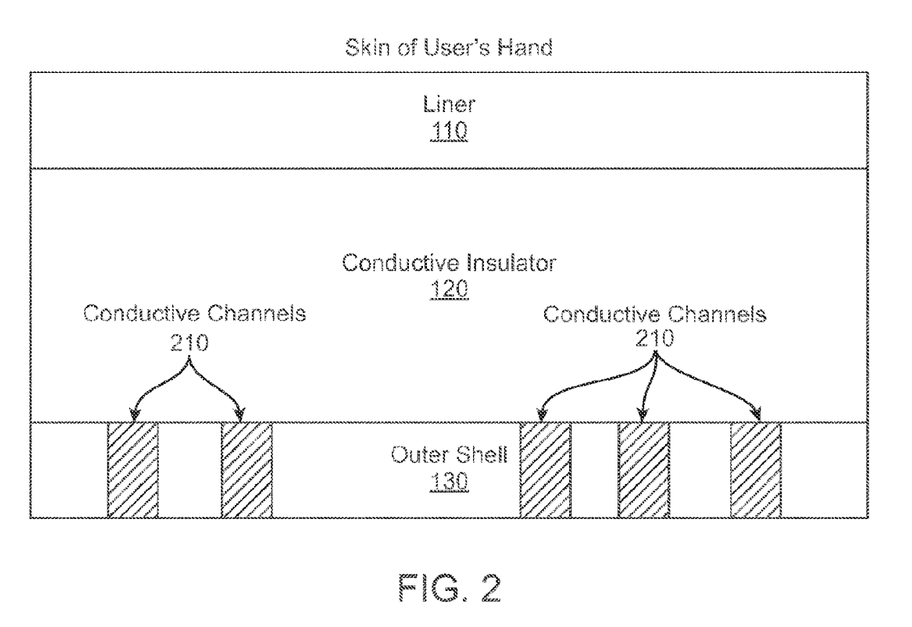
FIG. 2 shows a cross-section of another embodiment of an electrically conductive glove.

FIG. 2 shows a cross-section of another embodiment of an electrically conductive glove. This embodiment additionally includes at least one conductive channel 210. Each of the conductive channels 210 extends from an inner surface of the outer shell 130 to an outer surface of the outer shell 130

Embodiments of the conductive channels 210 include conductive material which may include resins, polymers, plastics, rubbers, foams, fibers, metals, epoxies or adhesives. The conductive channels provide enhanced conductivity between the skin of the user's hand and the external surface of the glove as defined by the outer surface of the outer shell 130.

One method of manufacturing the conductive channels includes perforating the outer shell material (before forming the glove with the conductive thermal insulator 120 and the liner 110) and filling the perforations with a conductive gel, adhesive, resin, foam, plastic, metal or fibrous substrate that meets the criteria of being conductive. The number of perforations can number from one to as many as desired in differing diameters, for the purpose of covering the surface area adequately to allow the user to interact with the device in the same manner they would if they were not wearing gloves. The perforations can be spaced in specific patterns for either aesthetic design or for materials that would normally be weakened by holes in material to allow for the strength of the material to not be compromised, provided that the function of allowing conductive interaction between the user and the device are not compromised.

Figure 3:
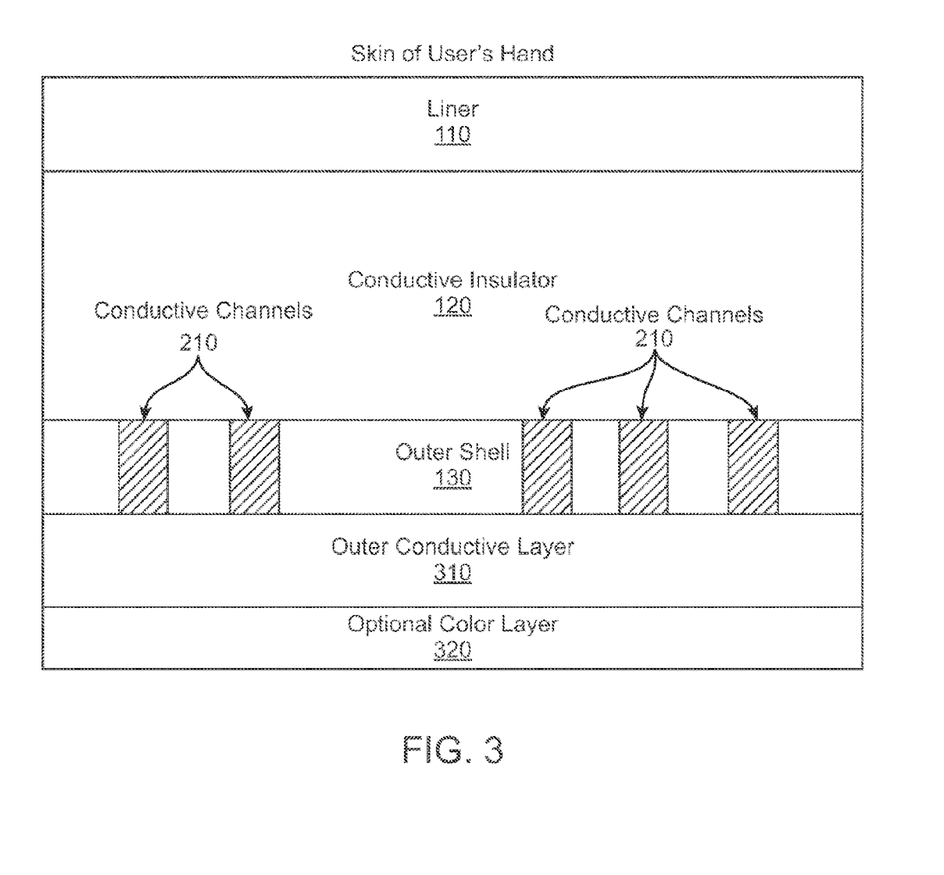
FIG. 3 shows a cross-section of another embodiment of an electrically conductive glove.

FIG. 3 shows a cross-section of another embodiment of an electrically conductive glove. This embodiment additionally includes an outer conductive layer 310 adjacent to the outer surface of the outer shell.

Embodiments of the outer conductive layer 310 include a base coating of polyurethane, polyepoxide, paint, adhesive, sealant, silicone, resins, polymers, plasticizers, vinyl compounds, metals or plastics materials with an added electroconductive carbon, silver, nickel, copper, tin, gold or other conductive metal or alloy into the coating in high concentrations to achieve a volume resistivity of less than $1.0 \times 10^6$ Ohm-cm which may or may not be specifically used to mimic the color, grain, texture and feel of the outer surface of the outer shell.

An optional additional layer includes a color layer 320 adjacent the outer conductive layer 310. Embodiments of the color layer are primarily aesthetic, and can be used to determine a glove color, texture, grain or appearance.

A method of manufacturing the glove structure as shown in FIG. 3 include, for example, an organic or inorganic fabric or material that is designed for the comfort and warmth of the user and functions as a method of wicking away moisture while allowing conductance to take place. The materials may be made of cotton or wool, for instance and meet the criteria of thickness and conductance needed. Adjacent to the liner would be the electrically conductive thermally insulative material; adjacent to the insulative material would be the outer shell with the conductive channels. Adjacent to the outer shell would be an outer conductive layer, which may or may not be colored or textured to match the outer surface of the outer shell.

Figure 4:
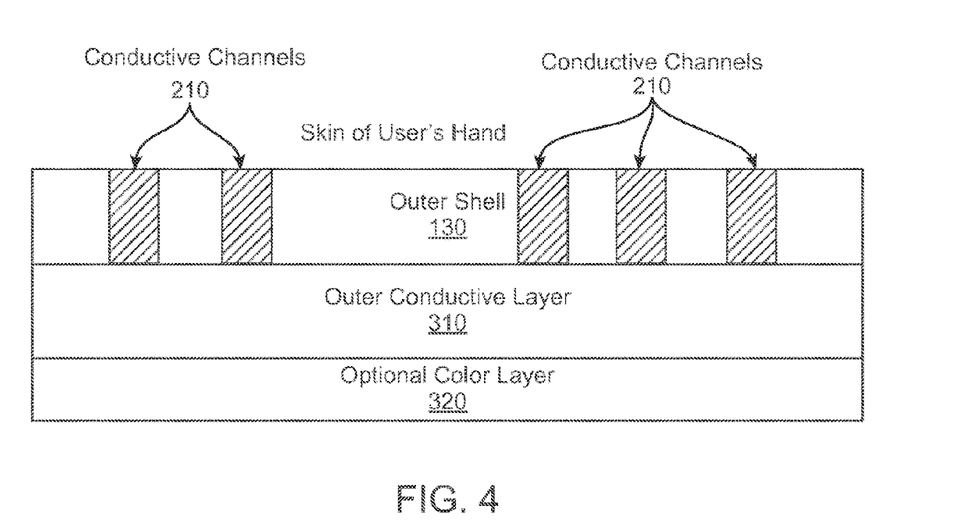
FIG. 4 shows a cross-section of another embodiment of an electrically conductive glove.

FIG. 4 shows a cross-section of another embodiment of an electrically conductive glove. This embodiment includes an outer shell 130. As shown, the outer shell 130 includes at least one conductive channel 210. Each of the conductive channels extend from an inner surface of the outer shell 130 to an outer surface of the outer shell 130. For an embodiment, each of the conductive channels has a volume and/or surface resistivity of less than $1.0 \times 10^6$ Ohm-cm.

Perforating the outer shell material (before forming the glove with the conductive thermal insulator 120 and the liner 110) and filling the perforations with a conductive gel, adhesive, resin, foam, plastic, metal or fibrous substrate that meets the criteria of being conductive. The number of perforations can number from one to as many as desired in differing diameters, for the purpose of covering the surface area adequately to allow the user to interact with the device in the same manner they would if they were not wearing gloves. The perforations can be spaced in specific patterns for either aesthetic design or for materials that would normally be weakened by holes in material to allow for the strength of the material to not be compromised, provided that the function of allowing conductive interaction between the user and the device are not compromised.

Alternate embodiments can additionally include one or more outer conductive layers 310 adjacent to the outer surface of the outer shell 310. The addition of the conductive layer 310 provides the ability to use less perforations, as few as one, that can be strategically placed in inconspicuous areas of the glove and provide a capacitive coupling anywhere on the treated surface of the outer surface of the outer shell.

A method of manufacture for the outer conductive layer includes, for example thin coat of conductive coating bonded to the outer surface of the outer shell by means of spraying, painting, heat/pressure bonding or by the use of a conductive adhesive material.

Once the material is made to be conductive, the material is said to be in "finished form".

Another embodiment includes a color layer 320. Embodiments of the color layer 320 color layer are primarily aesthetic, and can be used to determine a glove color, texture, grain or appearance.

The color layer can be formed by use of a chemical bonding, mechanical bonding or by spraying, painting, heat/pressure bonding or by the use of a conductive adhesive or primer coating.

Additional Glove Embodiments

Additional embodiments of the glove are discussed below. In one embodiment, the invention is directed to a conductive glove comprising:

a liner, the liner being less than 2 mm thick and/or having a resistance of less than $1.0 \times 10^6$ Ohm-cm;

an electrically conductive insulator layer, with a resistance of less than $1.0 \times 10^6$ Ohm-cm, adjacent to the liner; and an outer shell adjacent to the electrically conductive insulating layer, the outer shell being less than 2 mm thick and/or having a resistance of less than $1.0 \times 10^6$ Ohm-cm.

In one embodiment, the glove when worn by a user, at least a portion of the liner physically contacts the user's hand. The liner optionally may comprise at least one component selected from of rayon, acetate, nylon, modacrylic, olefin, PLAY polyester, wool, cotton, silk, acrylic, blends or conductive woven fiber blends, metallic fibers or fibers treated with copper, silver, carbon black, carbon fiber, nickel, tin or other conductive material with a thickness of less than about 2 mm. In one embodiment, the material has a volume resistivity of less than about $3.0 \times 10^5$ Ohm-cm, or alternatively, less than about $3.0 \times 10^6$ Ohm-cm, or alternatively, less than about $1.0 \times 10^6$ Ohm-cm and/or a surface resistivity of less than about $3.0 \times 10^5$ Ohm-cm, or alternatively, less than about $3.0 \times 10^6$ Ohm-cm, or alternatively, less than about $1.0 \times 10^6$ Ohm-cm.

The electrically conductive thermal insulator layer comprises a conductive foam, fiber, microfiber, microfilament, plastic, metal, rubber or breathable thermal insulation with a volume resistivity of less than $1.0 \times 10^6$ Ohm-cm and/or a surface resistivity of less than $1.0 \times 10^6$ Ohm-cm.

The conductive fiber, microfiber, microfilament or breathable thermal, electrically conductive, thermal insulation comprises materials made from different mixtures of polymers, but primarily polyethylene terephthalate or a mixture of polyethylene terephthalate and polypropylene. Other materials may include polyethylene terephthalate, polyethylene isophthalate copolymer and acrylic in combination with a conductive coating or impregnated, embedded, compounded or plated conductive material with a surface resistance of less than $1.0 \times 10^6$ Ohm-cm. This can be accomplished by the use of a chemical reaction to bond the molecules of carbon black, copper, silver, gold, nickel, tin or other conductive metal substances, with the molecules of the host fiber, or by plating or compounding any of these conductive substances to the host fiber.

The electrically conductive thermal insulator layer comprises a conductive foam, rubber, fiber, microfiber or microfilament.

The outer shell may comprise at least one conductive channel, the conductive channel extending from an inner surface of the outer shell to an outer surface of the outer shell. The glove may further comprise an outer conductive layer adjacent to the outer surface of the outer shell. The outer conductive layer comprises a base coating of polyurethane, polyepoxide, paint, adhesive, sealant, silicone, resins, polymers, plasticizers, vinyl compounds or plastics materials with an added electro-conductive carbon, silver, nickel, copper, tin, gold or other conductive metal or alloy into the coating in high concentrations to achieve a surface and/or volumetric resistivity of less than $1.0 \times 10^6$ Ohm-cm which may or may not be specifically used to mimic the color, grain, texture and feel of the outer surface of the outer shell.

The glove may also have a color layer adjacent the outer conductive layer, the color layer determining a glove color, texture, grain or appearance.

In another embodiment, the invention is directed to a conductive glove comprising: an outer shell, the outer shell comprising at least one conductive channel, the conductive channel extending from an inner surface of the outer shell to an outer surface of the outer shell, the conductive channel having a resistivity of less than $1.0 \times 10^6$ Ohm-cm. The glove may also have one or more outer conductive layers adjacent to the outer surface of the outer shell.

In another embodiment is provided a conducting glove comprising a nonconductive dielectric outer shell, the nonconductive outer shell being less than 0.5 mm thick and electrically conductive thermal insulator layer, with a volume resistivity of less than $1.0 \times 10^6$ Ohm-cm, adjacent to the liner; and an inner liner adjacent to the electrically conductive insulating layer, the inner liner being less than 2.0 mm thick or with a volume resistivity of less than $1.0 \times 10^6$ Ohm-cm where the capacitive touch screen is capacitively coupled to the conductive thermal insulator layer, which in turn is electrically conductive to the conductive inner liner, which in turn is electrically conductive to the user's skin. The conducting and insulating layers are located only at specific locations on the glove, such as the finger and thumb tips.

In another embodiment, is provided a conducting glove comprising a nonconductive dielectric outer shell, the nonconductive outer shell being less than 0.5 mm thick an electrically conductive thermal insulator layer, with a volume resistivity of less than $1.0 \times 10^6$ Ohm-cm, adjacent to the liner; and a non-conductive dielectric inner liner adjacent to the electrically conductive insulating layer, the inner layer being less than 0.5 mm thick where the capacitive touch screen is capacitively coupled to the conductive thermal insulator layer, which in turn is capacitively coupled to the user's skin. The conducting and insulating layers are located only at specific locations on the glove, such as the finger and thumb tips.

In still another embodiment is provided a conducting glove comprising an electrically conductive outer shell, the electrically conductive outer shell with a volume resistivity of less than $1.0 \times 10^6$ Ohm-cm an electrically conductive thermal insulator layer, with a volume resistivity of less than $1.0 \times 10^6$ Ohm-cm, adjacent to the liner; and a non-conductive dielectric inner liner adjacent to the electrically conductive insulating layer, the inner liner being less than 0.5 mm where the capacitive touch screen is electrically conductive to the outer shell, which in turn is electrically conductive to the thermal insulator layer, which is capacitively coupled to the user's skin. The conducting and insulating layers are located only at specific locations on the glove, such as the finger and thumb tips. The conductive fiber, microfiber, microfilament or breathable thermal, electrically conductive, thermal insulation comprise materials made from different mixtures of polymers, but primarily polyethylene terephthalate or a mixture of Polyethylene terephthalate and polypropylene. Other materials may include polyethylene terephthalate, polyethylene isophthalate copolymer and acrylic in combination with a conductive coating or impregnated, embedded, compounded or plated conductive material with a surface resistance of less than $1.0 \times 10^6$ Ohm-cm. This can be accomplished by the use of a chemical reaction to bond the molecules of carbon black, copper, silver, gold, nickel, tin or other conductive metal substances, with the molecules of the host fiber, or by plating or compounding any of these conductive substances to the host fiber.

The electrically conductive insulator layer may comprise a conductive foam, rubber, fiber, microfiber or microfilament.

The outer shell may comprise at least one conductive channel, the conductive channel extending from an inner surface of the outer shell to an outer surface of the outer shell. The glove may further comprise an outer conductive layer adjacent to the outer surface of the outer shell.

The outer conductive layer comprises a base coating of polyurethane, polyepoxide, paint, adhesive, sealant, silicone, resins, polymers, plasticizers, vinyl compounds or plastics materials with an added electro-conductive carbon, silver, nickel, copper, tin, gold or other conductive metal or alloy into the coating in high concentrations to achieve a surface and/or volumetric resistance of less than $1.0 \times 10^6$ Ohm-cm which may or may not be specifically used to mimic the color, grain, texture and feel of the outer surface of the out shell.

The glove may further comprise a color layer adjacent the outer conductive layer, the color layer determining a glove color, texture, grain or appearance.

In still yet another embodiment, the invention is directed to a conductive glove comprising: an outer shell, the outer shell comprising at least one conductive channel, the conductive channel extending from an inner surface of the outer shell to an outer surface of the outer shell, the conductive channel having a resistance of less than $1.0 \times 10^6$ ohm-cm. The glove may further comprise one or more outer conductive layers adjacent to the outer surface of the outer shell.

Also encompassed by the invention is a glove with a non-conductive layer, but that allows capacitive coupling between the screen and a conductive insulation material, or between the conductive insulation material and the finger.

In yet another embodiment, the invention is directed to a conductive or capacitively coupled glove that is only locally conductive or capacitively coupled, for example in the finger tip but not elsewhere. A glove that is a single conductive layer, for example, is just an outer shell.

In the following embodiment and method an electrically conductive glove suitable for interaction with a capacitive touch screen is described. An electrically conductive glove of the invention is fabricated in such a manner that the glove material, which may be non-conductive, or dielectric, initially, is coated, or treated, with a thin film of a conductive material. The material of the glove, for example leather, faux leather, suede, polymer, wool, cotton, fur, nylon, fleece, or any other suitable material, is coated in such a way that an electrically conductive surface layer is created on the outside of the glove. This electrically conductive coating may or may not penetrate into the material of the glove, but must a form an electrically conductive surface or surface layer when coated. In this manner the electrically conductive coating creates an electrical capacitance relative to a distant ground, or to the capacitive touch device, sufficient to be detected by a capacitive touch device with or without any grounding to a user or other ground source. To affect such an electrical capacitance, the surface area, geometry of the coating, electrical conductivity, and/or the volume of conductive material are sufficient to create an electrical capacitance relative to a distant ground, or to the capacitive touch device, sufficient to be detected by the capacitive sensors in the capacitive touch device. The conductive coating may be electrically conductively connected to the user, it may be electrically capacitively coupled to the user, or it may be electrically isolated.

A method for manufacturing of the electrically conductive glove described above is described here. A glove material is coated with an electrically conductive coating in such a manner as to coat the surface, penetrate the glove material, fill pores in a porous material, fill pores in a fibrous material, coat the fibers of a fibrous material, or otherwise render the material electrically conductive on or near its surface. The electrically conductive coating material may be generally manufactured by using a carrier, for example a plasticizer, a bulk polymer like acrylic, a weather proofing, a leather conditioner, an enamel, or any other suitable carrier, and filling said carrier with an electrically conductive medium, such as powdered carbon in the form of graphite or carbon black, powdered metal like silver, powdered indium-tin-oxide (ITO), electrically conductive polymers, or other powdered electrically conductive material or materials. The electrically conductive material may also be manufactured as a solution of one or more conductive materials, in one or more carriers and/or solvents. Said electrically conductive coating material is then applied to said glove material in such a fashion as to coat the surface, bond to the surface, and/or penetrate the surface in such a fashion as to create an electrically conductive surface, or near surface, layer on said glove material. Such electrical volume conductivities of said electrically conductive glove materials should preferably be less than $1.0 \times 10^6$ Ohm-cm, more preferably less than $1.0 \times 10^5$ Ohm-cm, and most preferably less than $1.0 \times 10^4$ Ohm-cm.

A glove pattern is then cut from said electrically conductive material and fabricated in any standard or non-standard glove fabrication process such that the electrically conductive surface is positioned preferably on the outside of one or more of the materials of the finished glove, but may be positioned on the inside of one or more of the materials of the finished glove.

The carbon black impregnated leather can be made into gloves or other types of instruments where a capacitive coupling is needed. Due to the treatment of this particular leather as disclosed herein, there is no need for capacitive coupling from the screen through the leather to the human body, as the leather itself is capable of capacitively coupling to the device. The leather is suitable for all products, such as gloves, where the need for capacitive coupling without human contact to the screen is required. Accordingly, a leather is provided herein which carbon black, or other electrically conductive agent, is suspended and trapped within the fiber matrix of the skins to create an internal capacitive network.

In one embodiment, the present invention is directed to a glove comprising a tanned leather or leather-like material having an internal fiber matrix; an electrically conductive agent bonded to the tanned leather or leather-like material so that the electrically conductive material penetrates the internal fiber matrix of the leather or leather-like material and are trapped and bonded to the fiber matrix; and the electrically conductive agent creates a capacitive network throughout the substrate and enables a capacitive coupling to a multi-touch capacitive touch screen without the need of an electron bridge to the human body.

In another embodiment, the present invention is directed to apparel which comprises a textile as disclosed herein having a fiber matrix which is capable of capacitively coupling to a multi-touch capacitive touch screen without the need of an electron bridge to the human body.

Yet another embodiment of the present invention is directed to a garment which comprises tanned leather or leather-like material as disclosed herein having an internal fiber matrix; an electrically conductive agent bonded to the leather or suffused to the fibers so that the electrically conductive agent penetrates the internal fiber matrix and are trapped within and bonded to the internal fiber matrix; and the trapped particles in the leather allow an electrostatic discharge of $1 \times 10^5$ or less.

Yet another embodiment of the present invention is directed to footwear which comprises the tanned leather or leather-like material as disclosed herein having an internal fiber matrix; an electrically conductive agent bonded to the leather or suffused to the fibers so that the electrically conductive agent penetrates the internal fiber matrix and is trapped within and/or bonded to the internal fiber matrix; and the electrically conductive agent in the leather or leather-like material provide for an electrostatic discharge of $1 \times 10^5$ or less.

EXAMPLES

The following formulations can be used in the compositions and methods disclosed herein.

Tanning Example 1

Tanning and Leather Preparation

Leather tanning is an ancient art, having its beginnings in South Asia somewhere between 7000-3300 BC. Leather tanning has been practiced on a wide variety of materials. The process described herein can be applied to many raw materials, for example including but not limited to sheep, goat, cow, deer, horse, reptile, bird, pig and kangaroo skin. The raw material depends upon the application for the final leather product required.

All animal skins are made of a fiber matrix that consists of water, protein, fatty material and mineral salts. These include elastin, collagen, keratin, albumens, globulins, mucins and mucoids. The protein may consist of many types, but the important ones are collagen which, on tanning, gives leather.

In the first embodiment of the method of the present invention, the raw material is brought to a fully chrome-tanned state, which imparts permanency to fiber structure. The chrome tanning process is described in Leather Technicians Handbook by J. H. Sharphouse, B.S.c. Leather Producers Association, Kings Park Road, Moulton Park, Northampton, NN3 1JD U.K. includes a series of steps as is discussed below.

1. First the skins are soaked in drums running at four revolutions per minute with 300% water at 27° Celsius and adjusted to a pH of 9.0 with 0.1% non-ionic surfactant. The skins are drummed intermittently for a period of 6 to 12 hours.

2. The skins are then drained.

3. The flesh sides of the skins are painted with 15% sodium hydrogen sulfide (33% strength), 50% hydrated lime and 35% water. The skins are allowed to pile overnight and then the wool is removed.

4. Next, 600% water and 12% lime are placed in a vat with agitating paddles run five minutes every four hours for 24 hours. Then 12% sodium sulfide is added to the vat and the agitating is continued for an additional 12 hours.

5. Next, the flesh is removed from the back side of the skin with a rotary fleshing machine.

6. Next, the skin is washed in soft, running water in a paddle vat for 30 minutes.

7. The skins are de-limed in paddle vats containing 500% water at 37° Celsius with 1.5% ammonium chloride where the paddles are run for 60 minutes or until the skins are free of lime.

8. The bating process includes the addition of 1% bacterial bate with the paddles run for two to three hours.

9. Next the skins are pickled in a drum with the pickling liquor being formed of 200% water at 20° Celsius, 20% salt and 2% sulfuric acid. The drum is run for 60 minutes, with the final pickle liquor strength being a 0.5% solution of sulfuric acid. The drum is then drained and the skins are stored for aging for several days.

10. The Chrome tanning solution is put in the drum. The tanning solution includes 100% water, 5% salt, 1% chromic oxide (as 10% of chrome liquor of 11% chromic oxide and 33% basicity, $SO_2$ reduced) and then 1% chromic oxide (as 10% of the chrome liquor). The skins are then drummed for from two to six hours in this mixture until penetrated.

11. The skins are then basified. To complete the tannage between about 3% to about 15%. 0.5-1% sodium bicarbonate should be added carefully over four hours and then a shrinkage temperature test should be taken. At the completion of tannage, the pH should be approximately 4.4 and the shrinkage temperature 98° Celsius.

12. The skins are then piled and drained for 24 hours.

13. Then the skins are neutralized thoroughly in the drum with 150% water and 1.5% ammonium bicarbonate.

14. Finally, the skins are washed well, at which point the leather is fully chrome tanned and ready for the re-tanning by the impregnation process of the present invention.

The chrome tanning process described above is well known in the art. It is provided as a guideline of the primary tanning process performed on the raw skins prior to the re-tanning process for impregnation of capacitive material of the present invention.

Other chrome tanning processes or even other basic mineral or vegetable tanning processes can be utilized as the preliminary tanning method. Chromium sulfate, zirconium, aluminum and vegetable tannages may also be utilized with the present invention.

Formulation Example 1

Leather

The leather (Full Grain Hair Sheep Skin) is sprayed with two layers of the base coat, first at a thickness of from 6.5 to 7.0 $G/FT^2$ (wet), then at a thickness of 6.0 $G/FT^2$ (wet), and then is plated (Sand, 90° C., 50 Kg). A top coat is sprayed to a thickness of from 1.5 to 2.0 $G/FT^2$ (wet) and the leather is subjected to a roto press at 250° C. (low pressure). Finally, the leather can be milled to achieve the desired visual and textile effect.

Base Coat

| Material Used | Parts |
| --- | --- |
| Water | 35 |
| Glycol Ether EP | 20 |
| Unithane IC-1600 | 25 |
| Unithane IC-1500 | 15 |
| Pigment | 2.5 |
| Black Carbon Powder | 2.5 |

Note:
The base coat is not filtered before use.

Top Coat

| Material Used | Parts |
| --- | --- |
| Water | 46.4 |
| Unithane IC-1400 | 25 |
| Unithane IC-1800 | 25 |
| Additive IC-04 | 0.8 |
| Additive IC-05 | 0.8 |
| Hardener CN | 2 |

Formulation Example 2

British Tan Leather

The leather (Full Grain Goat Skin) is sprayed with one layer of the base coat (wet), two layers of the mid coat, and one layer of the top coat (medium coat). The leather is then tumbled.

Base Coat

| Material Used | Parts |
| --- | --- |
| Water | 30 |
| Glycol Ether EP | 15 |
| Unithane IC-1600 | 30 |
| Unithane IC-1500 | 10 |
| Pigment | 13 |
| Black Carbon Powder | 2 |

Mid Coat

| Material Used | Parts |
| --- | --- |
| Water | 25 |
| Glycol Ether EP | 10 |
| Unithane IC-1600 | 45 |
| Unithane IC-1500 | 5 |
| Pigment | 15 |
| Black Carbon Powder | 0.5 |

Top Coat

| Material Used | Parts |
| --- | --- |
| Water | 46.4 |
| Unithane IC-1400 | 25 |
| Unithane IC-1800 | 25 |
| Additive IC-04 | 0.8 |
| Additive IC-05 | 0.8 |
| Hardener CN | 2 |

Formulation Example 3

Finished Felt

The felt is first dipped in base coat and allowed to dry in an oven at 85° C. The top coat is then sprayed on the treated felt.

Base Coat

| Material Used | Parts |
| --- | --- |
| Water | 35 |
| Glycol Ether EP | 20 |
| Unithane IC-501 | 25 |
| Unithane IC-1500 | 15 |
| Pigment | 2.5 |
| Black Carbon Powder | 2.5 |

Top Coat

| Material Used | Parts |
| --- | --- |
| Water | 46.4 |
| Unithane IC-1400 | 25 |
| Unithane IC-1800 | 25 |
| Additive IC-04 | 0.8 |
| Additive IC-05 | 0.8 |
| Hardener CN | 2 |

Method Example 1

Impregnating the Leather

1. The leather is washed at 110° Fahrenheit for approximately 1 hour with 200% water of Dry Weight of leather and 1% Formic acid, 1% detergent, 1% wetting agent and 1% Chelating agent added to the bath.

2. The leather is then rinsed at 110° for 10 minutes.

3. The leather is then re-floated at 90° F. 100% of dry weight for 30 minutes. 1% Formic acid, 10% gluteraldehyde, 25% carbon black is added to the bath.

4. A fat liquor at 6% of dry weight is then added to the bath which consists of a paraffin wax and this is run for three hours.

5. After 3 hours, 20% of the self pacifying chrome is added to the bath and this is run for 3 hours.

6. At the end of the runtime, the leather is then washed and 90° F. for 10 minutes and then cooled at 70° F. for 10 minutes.

7. At this point the carbon black has fully penetrated the fiber matrix of the skins and has bonded with the fibers creating an internal capacitive network throughout the leather fibers. Other aldehyde phenols and naphthalene ESD may be utilized as part of the gluteraldehyde solution and a preferred embodiment that gluteraldehyde solution utilized in the process may be between one and 7%, and even more preferred range between two and 5% and even more preferred 3%. The water component can be preferably between 25% and 400%, between about 20 and 80° Celsius; more preferably between 50% and 200% water between 40 and 60° C. and even more preferably 100% water 50° C. carbon black powder can be mixed in different concentrations down to as little as 10% depending upon the degree of capacitive nature required and a physical appearance in color required. Preferably the carbon black is between one and 25% even more preferably between 10 and 25% and even more preferably at about 20%. The amount of carbon black powder utilized varies depending upon the physical characteristics of the skins being re-tanned and the primary tanning process utilized. It is important to note that the proper amount of carbon black be used in the processing of the re-tanning. If not enough carbon black is used in the process, the functionality of the leather will not occur. Where a suitable amount of the carbon black as utilized the full benefits of the capacitive network throughout the leather skins are achieved. Thus even though the leather exhibits the surface characteristics of traditional black leather, the leather will allow a capacitive coupling to multi touch capacitive touch screen. The times indicated for the drumming of the carbon black and Glutaraldehyde an additional drumming of the calcium formate are preferred values and greater or lesser times may be utilized the following ranges for the drumming of the leather.

What is claimed is:

1. A glove formed at least in part of a modified leather material, said modified leather material comprising at least a portion of the glove and said modified leather material is leather having fiber matrices and is impregnated with a composition comprising:
   a non-metallic electrically conductive agent that comprises carbon black; and
   a binder for binding the non-metallic agent within the leather;
   wherein the non-metallic conductive agent and binder are impregnated at least into the modified leather material of the glove and further wherein the concentration of carbon black is from 10% to 25% based on the dry weight of the leather to be modified so as to provide for modified leather material in the glove which can functionally interact with a touch screen when worn by a user.

2. The glove of claim 1, wherein the carbon black further is found on the leather.

* * * * *